United States Patent [19]

Schreiner et al.

[11] 4,126,187
[45] Nov. 21, 1978

[54] REARFOLDING IMPLEMENT

[75] Inventors: Lester D. Schreiner; Ronald M. Steilen, both of Ankeny, Iowa

[73] Assignee: Deere & Company, Moline, Ill.

[21] Appl. No.: 760,383

[22] Filed: Jan. 18, 1977

[51] Int. Cl.² ................................. A01B 73/00
[52] U.S. Cl. ............................ 172/311; 280/411 A
[58] Field of Search ........... 172/311, 456, 313, 314, 172/662, 98, 99, 117, 5, 6; 56/228, 385, 6; 280/411 R, 411 A, 411 B, 411 C, 412, 413, 639, 656

[56] References Cited

U.S. PATENT DOCUMENTS

| 931,012 | 8/1909 | Lamkin | 56/385 |
|---|---|---|---|
| 1,249,648 | 12/1917 | McKinney | 280/412 |
| 1,762,919 | 6/1930 | Drabek | 280/411 C |
| 2,178,467 | 10/1939 | Brent | 280/412 |
| 2,748,679 | 6/1956 | Rogers | 172/117X |
| 3,334,916 | 8/1967 | Tibbals | 280/412 |
| 3,523,699 | 8/1970 | Sinkule et al. | 280/412 |
| 3,841,413 | 10/1974 | Applewhite | 172/311 |
| 3,935,907 | 2/1976 | Riet | 172/314 |
| 3,960,221 | 6/1976 | Blair et al. | 172/311 |
| 4,042,044 | 8/1977 | Hannold | 172/311 |
| 4,042,045 | 8/1977 | Hake | 172/311 |

FOREIGN PATENT DOCUMENTS

| 230,279 | 6/1960 | Australia | 172/311 |
|---|---|---|---|
| 149,149 | 3/1955 | Sweden | 280/413 |

Primary Examiner—Richard T. Stouffer

[57] ABSTRACT

An agricultural implement having a transverse main frame and transversely extending tool-carrying outer sections rearwardly foldable for transport. The main frame supports a pair of slide members which shift laterally thereon and to which the outer sections are pivotally connected. A hydraulically powered cylinder shifts the slide members transversely to separate the outer sections and provide clearance for tools carried thereon and smaller hydraulic cylinders swing each outer section about the pivotal connection and between their transverse and fore-and-aft positions.

17 Claims, 6 Drawing Figures

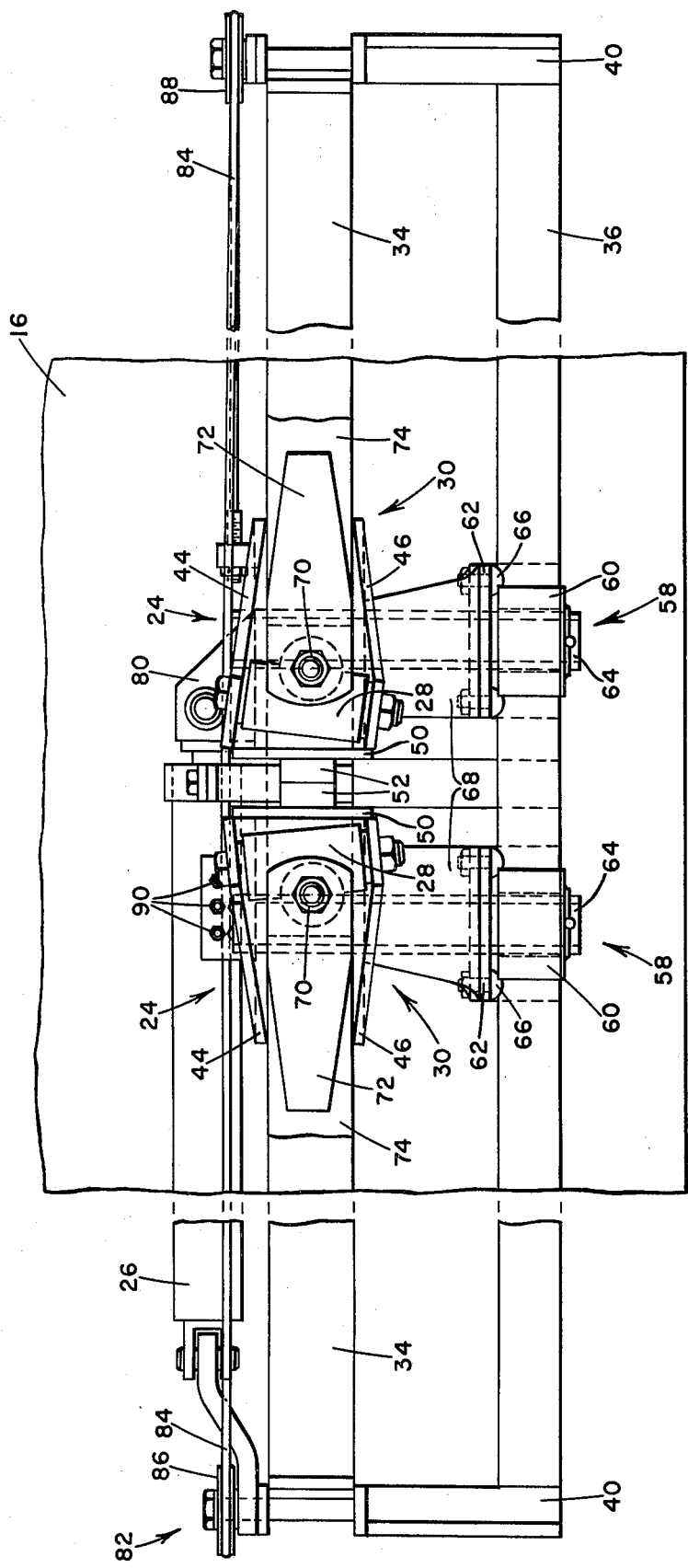

REARFOLDING IMPLEMENT

BACKGROUND OF THE INVENTION

The present invention relates generally to agricultural implements and more particularly relates to implements capable of being folded rearwardly for storage and transport purposes.

Modern drawn and integral implements are becoming wider and heavier as efforts continue toward increasing farmer productivity and profitability. As implements increase in size, transport and storage present a more significant problem for the farmer. Various means have been devised to reduce the size of implements for transport including rearwardly, forwardly and upwardly folding frame means.

When implement frames are folded rearwardly, it is necessary to prevent the tools mounted at the ends of the adjacent sections from interfering with one another. Consequently some existing rearfold implement frames utilize means to elevate the tool supporting toolbars on all sections prior to folding, while others rearwardly offset the wing sections from the center section by an amount substantially equal to the tool width. For an example of this latter approach, see copending application of assignee Ser. No. 665,067, filed Mar. 8, 1976, and issued Nov. 1, 1977, as U.S. Pat. No. 4,056,149.

A significant disadvantage inherent in those implements which elevate the working tools for transport is that the hinges and frames must be structurally strengthened to withstand the stresses and loadings encountered as the wings are carried in their elevated position. This requirement results in oftentimes burdensome manufacturing and maintenance expenses. Further, seed, fertilizer and other materials carried in hoppers on such implements either have to be emptied prior to transport or can be lost as the hoppers are rotated onto their sides. Further, upwardly folding wing sections are limited as to maximum width since the folded outer sections extend upwardly and will prevent passage beneath rural power lines, trees and other low-hanging obstacles if too high.

In those implements wherein the wing sections are offset from the center section, the tools on adjacent sections operate on fore-and-aft offset transverse lines, thereby resulting in inconsistent tool depth penetration whenever undulating ground contours are encountered. These implements further separate the wing sections from the tractor resulting in more difficult maneuvering and steering during operation.

Forwardly folding implements which fold alongside the tractor naturally have the tools projecting transversely outwardly and present transport hazards and width problems. Further, the projecting tools are exposed to section damage during transport.

SUMMARY OF THE INVENTION

The principal object of the present invention is to provide a rearfolding agricultural implement which can be simply and automatically folded between the operational and transport configurations and one in which the outer sections are shifted transversely to separate the sections and eliminate interference between tools carried thereon. A further object is to provide a folding implement having the tool-carrying sections transversely aligned during operation to assure that the mounted tools operate on a single transverse line.

Another object of the present invention is to provide a folding implement in which the tool-supporting surfaces of the outer sections face one another during transport so as to protect the tools from damage.

A more specific object is to provide a transversely shiftable member supported by the center section and designed to withstand the twisting forces transferred thereto by the outer sections as the tools engage the ground during operation and the outer sections rise and fall during transport.

Another more general object is to provide a foldable implement frame adapted to either drawn or integral usage and one which can be utilized for whatever row width as might be desired.

BRIEF DESCRIPTION OF THE DRAWINGS

In the drawings:

FIG. 6 is an expanded rear elevational view of the slides when in an abutting or operational position.

DESCRIPTION OF THE PREFERRED EMBODIMENT

Figure 1:
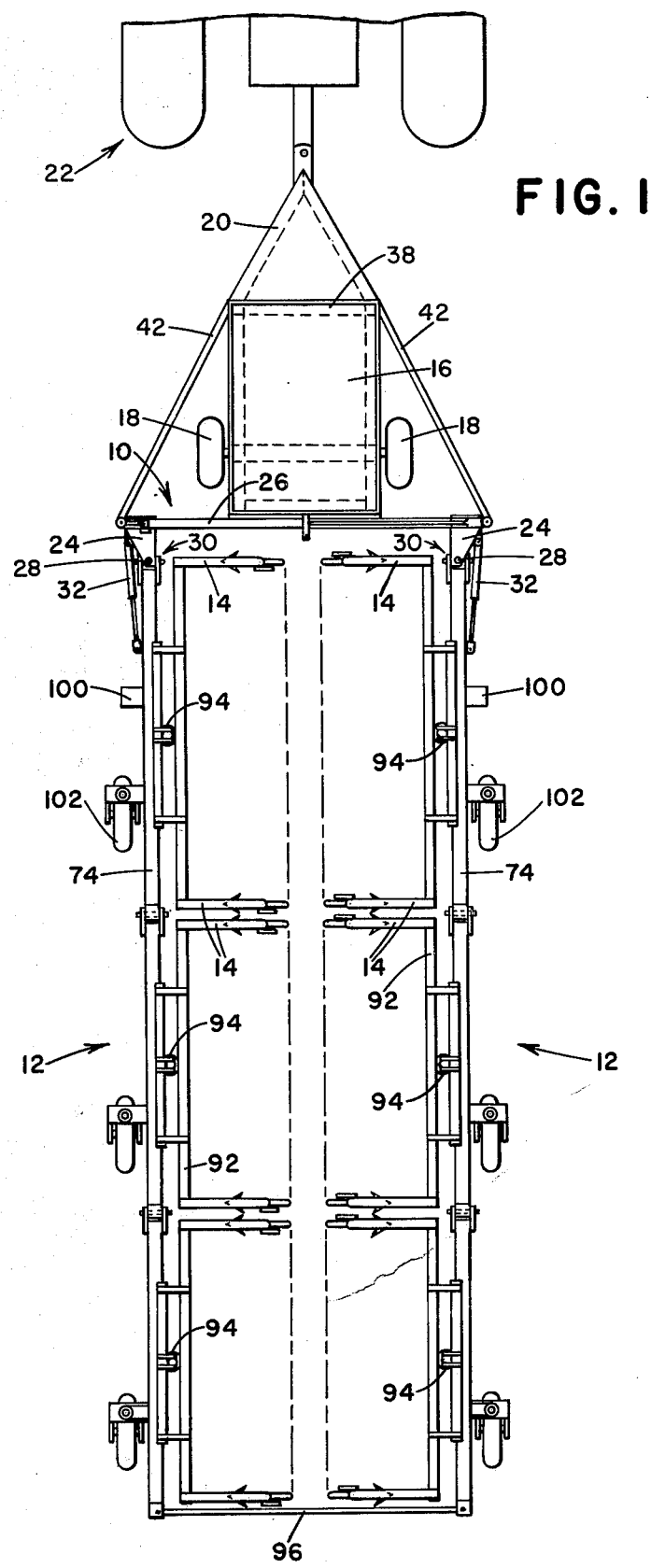
FIG. 1 is a plan view of the foldable implement illustrating the outer sections in a transport configuration.

Referring now to the drawings and particularly FIG. 1, there is illustrated an implement frame having a center section in the form of a transverse beam or guide structure 10 and a pair of tool-supporting frames or outer sections 12 movable between a first transversely extended operational position and a second fore-and-aft transport and storage position. The preferred embodiment is illustrated in conjunction with grain drill openers 14 and provides for a central grain storage tank 16 located forwardly of the center section 10 and supported on ground-engaging wheels 18. Attached to the forwardly end of the grain storage tank 16 is a hitch means 20 for releasably coupling the foldable implement frame with a tractor 22.

Figure 3:
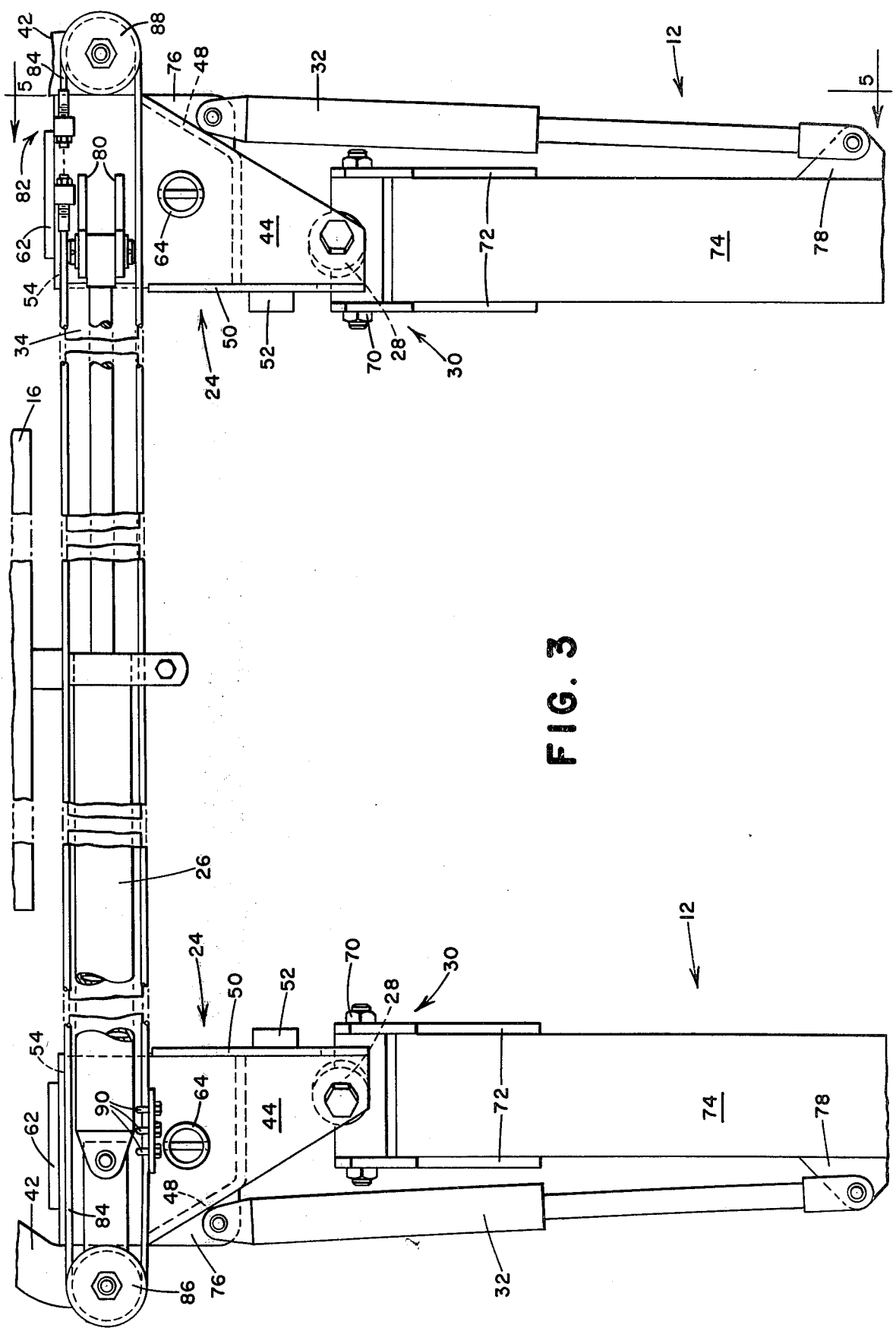
FIG. 3 is an enlarged plan view of the folding mechanisms with portions of the center frame broken out.
Figure 4:
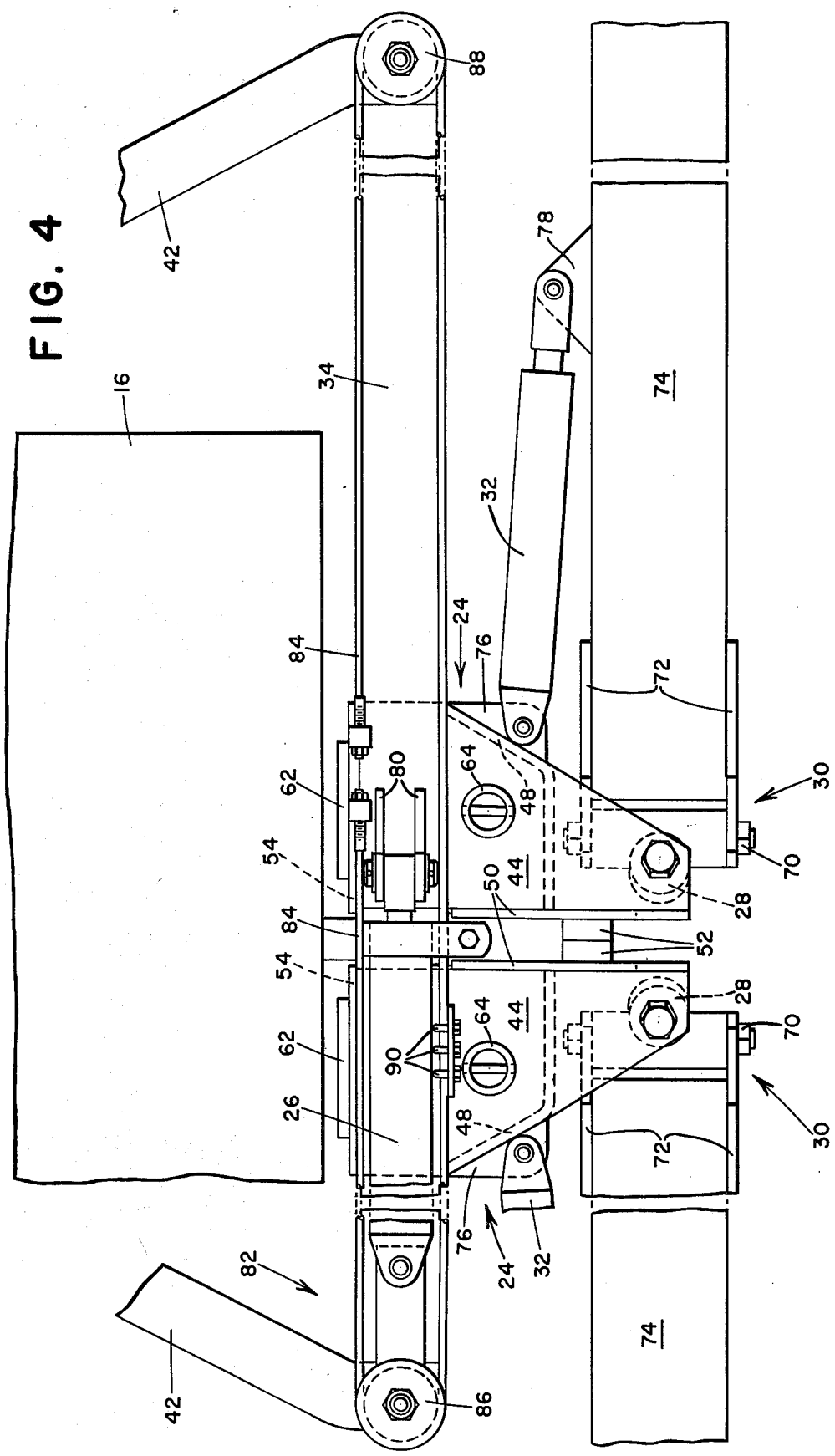
FIG. 4 is an enlarged plan view of the folding mechanisms illustrating the slide members in an abutting position.

Provided between the center section 10 and each outer section or frame 12 and best illustrated in FIGS. 3 and 4 is the means for moving the outer sections 12 between their transverse separated and extended and fore-and-aft positions. This means includes frame-carrying structure in the form of slide members 24 and powered means 26 carried by the center section for shifting the slide members 24 transversely. Each frame-carrying structure 24 has a rearwardly projecting portion with each portion having a vertical pivot structure 28. Connecting structure 30 on the inner end of each outer section connects the latter with its respective pivot 28 for rotation thereabout. A second powered means in the form of hydraulic cylinder 32 carried between each slide member 24 and its respective outer section 12 serves to hold the section 12 against shifting and also shifts the respective section 12 between its transverse and fore-and-aft positions.

Figure 5:
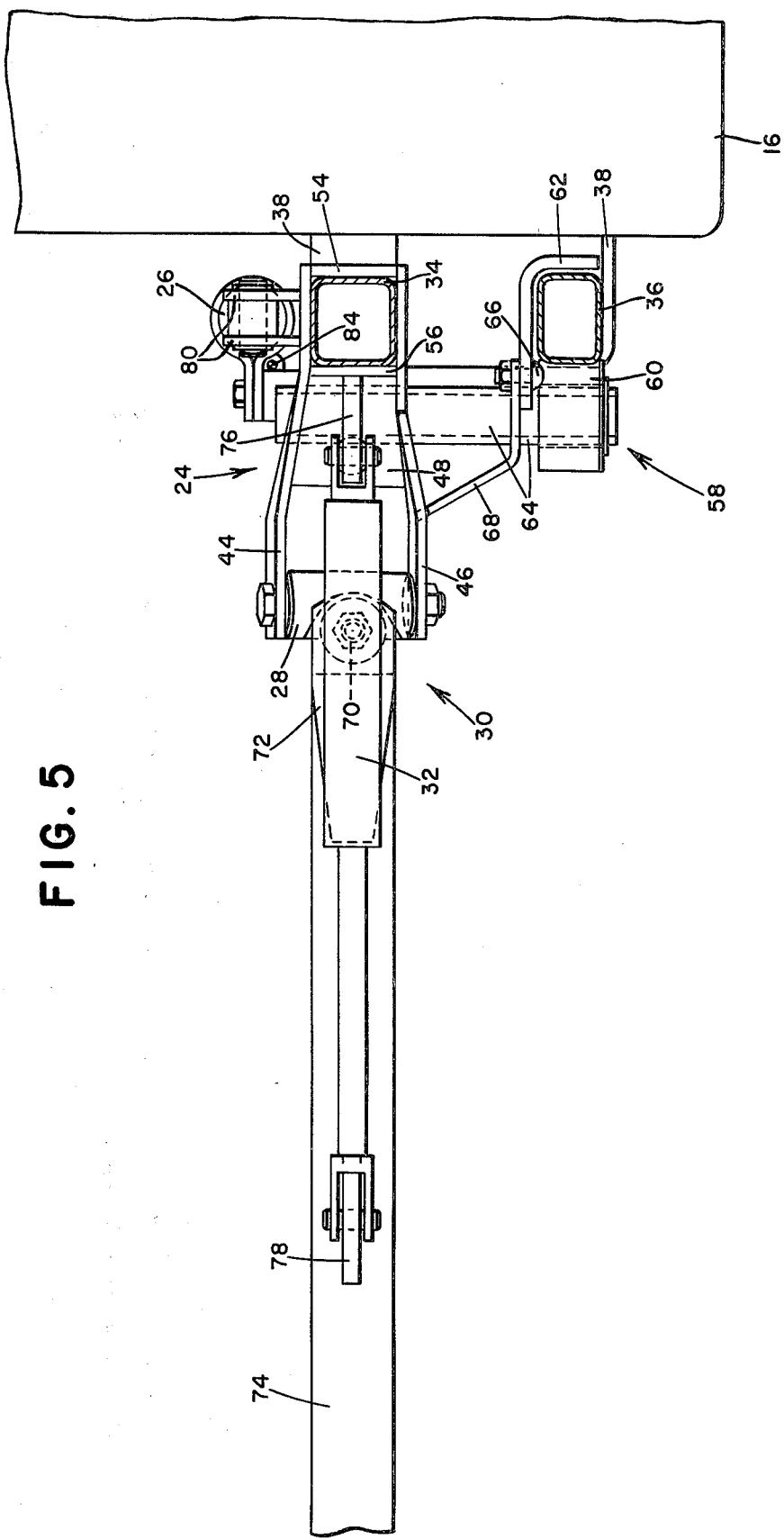
FIG. 5 is an expanded end view of a slide member taken along lines 5—5 of FIG. 3 and illustrating the slide support structure and folding mechanism.

The center section 10, as shown in FIGS. 5 and 6, is comprised of a transverse upper beam 34 and lower slide support rail or structure 36 connected at their center front portions with the grain tank frame 38 and at their respective outer ends to a vertical stabilizing plate 40 (see FIG. 6). Rigid towbar members 42 extend from each end of the upper beam 34 to the grain tank hitch 20 structure to provide further support for the center section beam 34 and slide support rail 36.

Surrounding in sleeve-like fashion and projecting rearwardly from the center section beam 34 are the slide members 24. The structures of these members 24 is best shown in FIGS. 3, 4, 5 and 6. Each slide member 24 includes upper and lower flat plates numbered respectively 44 and 46 with said plates joined by rigid side plates 48 and 50 to form a generally triangularly-shaped box structure. To the vertical side plate 50 of each slide 24 is attached a resilient bumper means 52 abuttable with a like bumper means carried by the other slide 24 when said sections are moved to an adjacent or field operating position. Slide plates 44 and 46 are joined at their forward ends by vertical plate 54 and at their midportion by vertical plate 56 to surround in a loose sleeve-like fashion the center section beam 34. Projecting downwardly from each slide member 24 is a slide support structure 58 for counteracting horizontal twisting motion of the slides 24 about their beam member 34 (see FIG. 5) as the slides are shifted along the beam 34. The slide support is comprised of a roller 60 which contacts the back surface of the support rail 36 and a forwardly and downwardly extending L-shaped guide plate 62 which contacts the forward side of the rail 36. The roller 60 is rotatably carried by a vertical tubular member 64 which in turn is carried by the slide plates 44 and 46. The L-shaped guide plate 62 is secured by bolts 66 to a downwardly and forwardly projecting arm 68 carried by the slide lower flat plate 46.

Supported between the upper and lower plates 44 and 46 and at the rearward end of the slide member 24 is the upstanding pivot structure designated 28. It is this pivot structure 28 to which the outer section 12 is connected and about which the outer section 12 rotates between its transverse operating and fore-and-aft transport positions. As is obvious from FIG. 3, this pivot structure 28 is slightly offset from true vertical so as to compensate for the twisting forces exerted upon it during transport by the trailing outer section and the elevated tools. Welded to the pivot structure 28 at its rearwardly surface is a horizontal pivot 70 about which the outer section 12 rocks as undulating contours are encountered. This pivot 70 is carried by vertical side plates 72 which in turn are welded to the sides of the outer section main frame 74.

Looking now to FIGS. 3 and 4, there is illustrated the folding hydraulic cylinder or second powered means 32 utilized for rotating the outer section 12 about the pivot structure 28 and between its transversely extended and fore-and-aft positions. The cylinder has its base end connected to an ear 76 carried by the outer side plate 48 of the slide member 24 and has its ram end connected to a similar ear 78 carried by the outer wall of the outer section main frame 74. The base end of the cylinder 32 is universally coupled with the ear 76 to accommodate minor twisting of the outer section during operation. Included in the hydraulic system is a valving arrangement which prevents extension of the folding cylinder 32 until after the slide cylinder 26 has laterally shifted the slides a particular distance. With this provision the outer sections could not begin to rotate rearwardly until the necessary clearance between tools on adjacent ends of the outer section 12 was assured.

Referring again to FIGS. 3 and 4, it can be seen that the first powered means or hydraulic cylinder 26 carried on the center section 10 has its base end anchored at one end of the center beam 10 and its ram end pivotally connected between a pair of upstanding ears 80 secured to the right hand slide member 24. Accordingly, extension and retraction of the hydraulic cylinder 26 causes the right-hand slide member 24 to be reciprocably moved between its inwardly and outwardly positions. A cable and sheave means 82 is also carried by the center section 10 and cooperates with the hydraulic cylinder 26 to shift the left slide member 24 in unison with but in opposite directions to the right slide member 24 as it is moved by the hydraulic cylinder ram 26. Comprising this cable and sheave means 82 is a flexible cable 84 trained around first and second sheaves or pulleys numbered respectively 86 and 88 and mounted for rotation about vertical axes at opposite ends of the center section beam 34. Each end of the cable 84 is attached to the upper plate 44 of the right slide member 24 so as to draw the cable 84 about the sheaves 86 and 88 as the hydraulic cylinder 26 expands and retracts. To shift the left slide 24 in unison with the right slide 24, the cable 84 is secured to the left slide by U-bolts 90. Thus it can be seen that extension of the hydraulic cylinder 26 will move the right slide member 24 and thereby the cable 84 which in turn causes the left slide member 24 to move equally, but in opposite directions from the first slide member 24.

Each outer section 12 includes a main frame 74 supporting rearwardly extending toolbars 92 which carry a plurality of grain drill openers 14. The openers 14 can be shifted between lowered and raised positions by activation of hydraulic cylinder 94 carried by the frame 74. Means is also provided for transporting the grain from the storage tank 16 to each grain opener 14, but is not important to the invention disclosed herein and therefore is not illustrated. During transport the outer sections 12 are transversely separated and extend rearwardly from their respective pivot structure 28 as viewed in FIG. 1. To stabilize the ends of the trailing outer section 12 during transport, a rigid link 96 is manually pinned therebetween.

Figure 2:
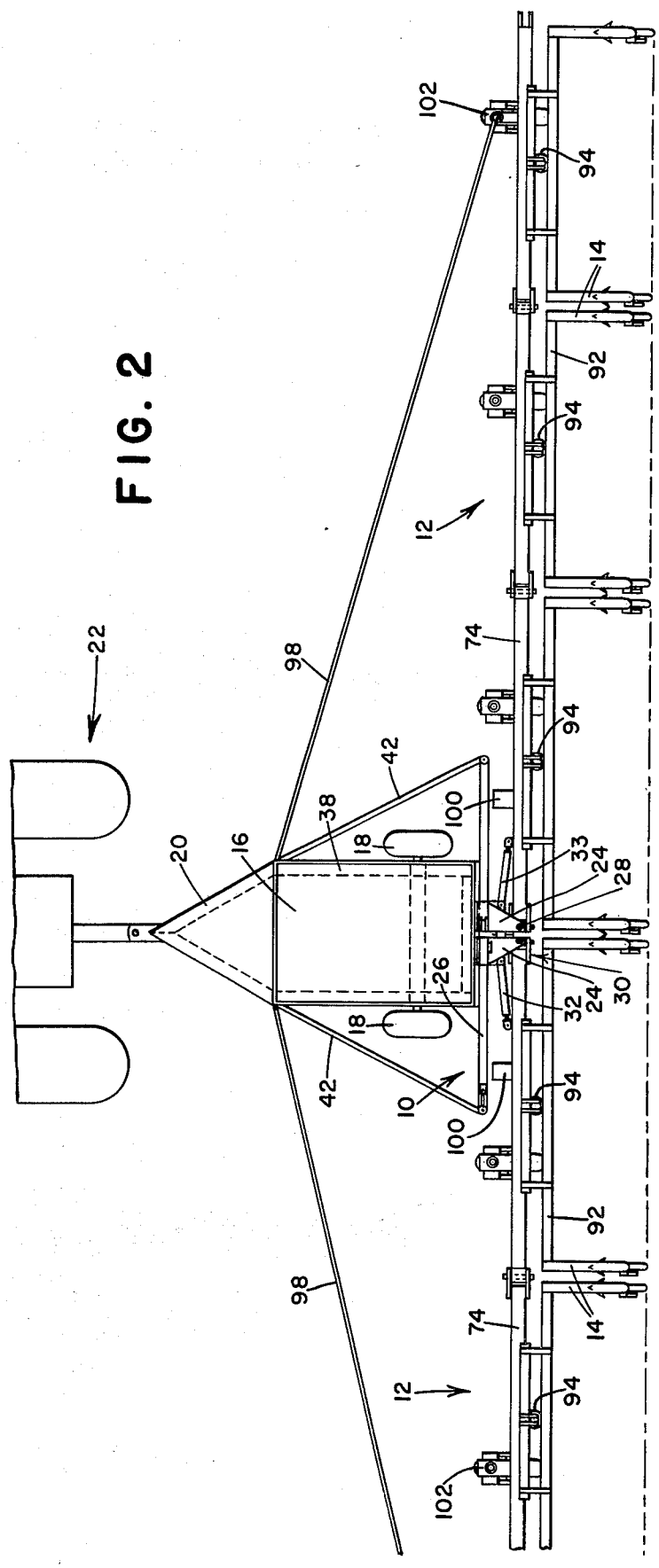
FIG. 2 is a plan view similar to FIG. 1, but illustrating the greater part of the implement in an operational configuration.

During operation the implement is as illustrated in FIG. 2, with the slides 24 abutting at their inner ends and the grain drill openers 14 aligned along a common transverse line to minimize depth variations during operation. Tow cables 98 are connected between the storage tank support frame 38 and each outer section 12 to retain that respective section in its transverse orientation during operation. Each section 12 is free to rotate about the horizontal axis through horizontal pivot 70 and thereby accommodate changes in ground contour encountered during operation. The respective slide members 24, attached to the inner end of each outer section 12, abut during operation with the resilient bumper means 52 absorbing the transverse forces transferred along the outer section frame 12 and generated by the inwardly pull of the two cables 98. In this way damage to the abutting slide members 24 can be avoided. At the forward edge of each outer section frame 12 are provided additional resilient bumper means 100 for abutting the center section frame 34 to prevent damage to either the frame 34 or outer section 12.

At the completion of operations, the tow cables 98 are disconnected and stored. The outer sections 12 are then slidably moved transversely and folded rearwardly into the trailing positions illustrated in FIG. 1. To slide the outer sections 12 outwardly, the hydraulic cylinder 26 is activated to shift the slide members 24 from their inward positions to outward positions adjacent the ends of the center section 10. As the right slide member 24 is moved by the hydraulic cylinder 26, the flexible cable 84 is also moved transversely and accordingly, pulls the left slide member 24 in an opposite transverse direction to move it in unison with the right slide member 24. The slide supports 58 projecting downwardly from each slide member 24 serve to support the slide during transport and operation and prevent twisting damage to the slides 24 as the weight and draft on the drill openers 14 act to rotate the slides 24 about the support beam 34. Each outer section 12 is supported on caster wheels 102 for movement laterally and rearwardly as the side sections 12 are folded. While means can be provided in the folding mechanism hydraulic system to prevent activation of the folding cylinders 32 prior to completion of the expansion of the slide cylinder 26, more simplified folding can be effected if the outer sections 12 are folded about their respective pivot structures 28 during the same movement in which they are shifted laterally. Accordingly, the folding cylinders 32 would be activated after the slide members 24 have been moved transversely a distance sufficient to avoid the interference which might occur between rearwardly extending grain drill opener mechanisms 14. To fold each outer section 12 rearwardly, the operator activates the folding hydraulic cylinder 32 to extend the ram end and rotate the section 12 about its respective pivot structure 28 to a rearwardly extended position. Upon completion of this rotation, the operator pins link 96 between the trailing outer ends of the outer sections 12 to secure them during transport and prevent damage to the folding hydraulic cylinders 32.

We claim:

1. In a foldable agricultural implement having a transverse main section and at least one tool carrying outer section, the improvement comprising: a member supported for transverse movement along the main section between a first position near the end thereof and a second position inwardly spaced therefrom and near the center of said main section; first powered means carried by the main section for shifting the member between its first and second positions; a vertical pivot structure carried by the member; means coupling the inner end of the outer section with the vertical pivot structure for swinging movement thereabout; and second powered means carried between the member and outer section for swinging the latter between a transversely extended and a fore-and-aft position.

2. The invention defined in claim 1 wherein there is further provided means to prevent swinging movement of the outer section except upon movement of the member from its second position.

3. The invention defined in claim 1 in which the member is a slide member movable along the main section and further characterized as having a slide support carried by said slide member, said slide support having a surface spaced from said slide member and engageable with the main section during transverse movement of said slide member along the main section.

4. The invention defined in claim 3 wherein the main section is further characterized as having a first transverse beam upon which said slide member is supported and a second transverse beam spaced therebelow, and the slide support has a vertically disposed portion with the aforesaid surface being engageable with the second beam.

5. In a foldable agricultural implement having a transverse center section and a pair of outer sections, the improvement comprising: first and second slide members supported on the center section and shiftable between adjacent and spaced apart positions; first powered means carried by the center section and coupled with the first slide member for shifting it between its positions; cable means connecting the slide members for opposite transverse movement in unison whereby reciprocable movement of the first slide member effects opposite reciprocable movement of the second slide member; vertical pivot means coupling each said outer section to one of said respective slide members for swinging movement between transversely extended and fore-and-aft positions; and second powered means carried between each slide member and its outer section for swinging said section about its pivot means between its extended and fore-and-aft positions.

6. The invention defined in claim 5 wherein the cable means includes a pair of pulleys spaced apart on the center section and a cable trained about each pulley, both ends thereof secured to one slide member and the midportion thereof anchored to said other slide member.

7. The invention defined in claim 5 wherein the center section includes first and second vertically spaced transverse beam surfaces, the slide members shiftably supported on the first beam surface and a slide support member vertically projecting from said slide member carries a roller surface abuttable on said second beam surface.

8. The invention defined in claim 5 wherein there is further provided means for preventing swinging movement of the outer sections except upon said slide members being moved from their adjacent positions.

9. The invention defined in claim 5 wherein resilient members are provided between said slide members on their adjacent surfaces and each outer section also carries a resilient member for abutment with the center section when said outer section is in its extended position.

10. In a foldable agricultural implement having a transverse main section and a pair of outer sections, the improvement comprising: first and second carriages supported on the main section and movable between adjacent and spaced apart positions; a transverse carriage support structure carried by the main section and spaced below the carriages; a slide support member depending from each carriage and including a surface abuttable with said support structure; a vertical pivot structure carried by each carriage; first powered means carried by the main section and coupled with the first carriage; a pulley supported on the main section transversely of each carriage; a flexible cable trained about said pulleys, both ends thereof secured to one carriage and the midportion secured to the other slide member whereby transverse reciprocable movement of the first carriage effects opposite reciprocable transverse movement of the second carriage; means coupling the inner end of each outer section with a respective pivot structure for swinging movement thereabout between transversely extended and fore-and-aft positions; and second powered means carried between each carriage and its respective outer section for swinging said section between its extended and fore-and-aft positions.

11. The invention defined in claim 10 wherein there is further provided means for preventing swinging movement of the outer sections except upon said slide members being moved from their adjacent positions.

12. The invention defined in claim 10 wherein resilient members are provided between said slide members on their adjacent surfaces and each outer section also carries a resilient member for abutment with the center section when said outer section is in its extended position.

13. A foldable agricultural implement composed of a transverse guide structure; a pair of transversely extending frames having inner and outer ends; a plurality of rearwardly projecting tools spaced substantially uniformly; a pair of frame-carrying structures carried on the guide structure for transverse movement between an inner position near the center of said guide structure and in which position the frame-carrying structures are closely adjacent one another and an outer position in which the frame-carrying structures are widely spaced from one another, each of said frame-carrying structures having a rearwardly projecting portion and each portion having a vertical pivot thereon; means connecting the inner end of each frame to a respective vertical pivot whereby said inner ends may be shifted transversely with their respective frame-carrying structures so that said inner ends may also be moved between inner and outer positions in which said inner ends are closely adjacent and widely spaced from one another upon shifting of the frame-carrying structures; first power means between the transverse guide structure and the frame-carrying structures for shifting the latter between their respective inner and outer positions; and second powered means for swinging said frames about their respective inner ends and between transversely extending and fore-and-aft extending positions.

14. The invention defined in claim 13 in which the transverse guide structure is pulled by a tractor in a central location behind the tractor and the inner ends of the tool-supporting frames are closely adjacent the fore-and-aft center line of the tractor and implement when they are in their inner positions.

15. The invention defined in claim 14 in which the width of transverse shifting of said tool-carrying frames between their inner and outer positions is greater than the rearward projection of said tools from the frames.

16. The invention defined in claim 13 in which the means holding the tool-supporting frames from shifting on their respective vertical pivots are hydraulic cylinders extending between the respective frames and their respective frame-carrying structures.

17. A foldable agricultural implement comprising: a pair of transversely aligned transverse toolbars having their inner ends adjacent the center of the implement; a plurality of tools projecting outwardly from said toolbars at substantially uniform spacings; a transverse beam offset from the toolbars and extending transversely outwardly of the inner ends of said toolbars; a pair of rigid toolbar carriers mounted on the beam for transverse shifting thereon between positions near the center of the beam and positions outwardly spaced therefrom, said carriers having vertical pivot means offset from the beam, means connecting each toolbar to a respective pivot means so that said toolbars may swing about their inner ends and between their respective transversely aligned positions and a fore-and-aft extending position; and first power means between the toolbar carriers and the transverse beam for shifting the carriers and their respective toolbars transversely so that interference between the tools carried on the toolbars may be prevented upon said toolbars being swingably moved to their fore-and-aft positions; and second power means between the toolbars and their respective carriers for swingably moving said toolbars between their transversely aligned and fore-and-aft extending positions.

* * * * *